United States Patent [19]

Linscheid et al.

[11] 4,285,466
[45] Aug. 25, 1981

[54] APPARATUS FOR MIXING HIGH AND LOW PRESSURE AIR FROM A JET ENGINE

[75] Inventors: Larry L. Linscheid, Wichita; Philip M. Mueller, Derby, both of Kans.

[73] Assignee: The Boeing Co., Seattle, Wash.

[21] Appl. No.: 124,530

[22] Filed: Feb. 25, 1980

[51] Int. Cl.³ .............................................. G05D 23/13
[52] U.S. Cl. ........................................ 236/13; 98/1.5; 165/15
[58] Field of Search .................. 236/13; 98/1.5, 38 C; 165/15; 244/59; 60/39.07, 726

[56] References Cited
U.S. PATENT DOCUMENTS

| | | | |
|---|---|---|---|
| 2,412,071 | 12/1946 | Warner et al. | 98/1.5 |
| 2,772,621 | 12/1956 | Arnoldi | 98/1.5 |
| 3,045,983 | 7/1962 | Best | 165/15 |
| 3,367,255 | 2/1968 | Terp | 98/1.5 |
| 3,367,256 | 2/1968 | Townsend et al. | 98/1.5 |
| 3,441,045 | 4/1969 | Malone | 98/1.5 X |
| 3,711,044 | 1/1973 | Matulich | 98/1.5 X |
| 3,842,720 | 10/1974 | Herr | 98/1.5 |

*Primary Examiner*—William E. Tapolcai, Jr.
*Attorney, Agent, or Firm*—Edwin H. Crabtree

[57] ABSTRACT

An apparatus for mixing high and low pressure air from a jet engine and introducing the air to an air duct of the air conditioning system of an aircraft. The apparatus provides a plurality of high pressure nozzles inside an air-mixing chamber. By controlling the opening and closing of the nozzles individually, a stepped area ratio of high pressure air with low pressure air is provided for regulating the temperature of the mixed air to the air conditioning system of the aircraft while the aircraft is taking-off, climbing, cruising at various altitudes and landing.

7 Claims, 2 Drawing Figures

APPARATUS FOR MIXING HIGH AND LOW PRESSURE AIR FROM A JET ENGINE

BACKGROUND OF THE INVENTION

The subject invention relates broadly to an apparatus for mixing high and low pressure air and more particularly but not by way of limitation, to a stepped area ratio ejector precooler for mounting between a jet engine and the air conditioning air duct of an aircraft for regulating a mixture of low pressure and high pressure air received from the jet engine.

Heretofore, a compressor section of a jet engine aircraft was used to supply energy in the form of pressurized air to the cabinet air conditioning system. This pressurized air is commonly called "bleed air" and is bled from bleed ports located at various stages of compression in a multi-stage compression section of the engine. To supply sufficient bleed air over the operating range of the aircraft, a high pressure bleed port is used. The temperature of this bleed air is normally too high for the cabin air conditioning system and some precooling of the bleed air is required. Cooling is usually accomplished through the use of a plate fin type heat exchanger. A cooler bleed air is bled from a low pressure bleed port of the engine compressor, passed through the heat exchanger and then discharged from the aircraft. Use of the high pressure bleed air from the cabin air conditioning plus the use of the low pressure bleed air for precooling penalizes the total operating condition of the engine in terms of fuel usage per unit propulsive thrust available to the aircraft. This penalty can be minimized if the air is extracted from a lower pressure stage of the engine and if discharging of the precooled bleed is eliminated. The subject invention embodies both these features.

Prior art aircraft cabin pressurizing systems are disclosed in U.S. Pat. No. 3,441,045 to Malone, U.S. Pat. No. 3,367,256 to Townsend et al, U.S. Pat. No. 3,367,255 to Terp, U.S. Pat. No. 3,842,720 to Herr, and U.S. Pat. No. 3,711,044 to Matulich. None of these environment control or pressurized systems disclose the unique features and advantages of the invention disclosed herein.

SUMMARY OF THE INVENTION

The subject invention provides an air flow delivery system utilizing a multiple nozzle mixing ejector for meeting precooling and flow rate requirements of a fluid system by mixing low pressure air with high pressure air through an aspiration ejection pumping action of high pressure air nozzles. By controlling the nozzles, the mixing of the sources of high and low pressure air are properly proportioned to provide flow rate requirements of the aircraft's air conditioning system throughout the operating envelope of the aircraft.

The ejector for mixing high and low pressure air from a jet engine provides an air flow delivery system which extracts two sources of air from an engine compressor section and utilizes the low pressure air source to precool the high pressure air delivered to the air conditioning system during take-off, climb and normal cruise operation. Also, the high pressure air is used to pump the low pressure air into the air conditioning system at lower engine power levels. By using both high and low pressure bleed air properly mixed, the efficient use of the jet engine is increased.

Further, the apparatus includes a plurality of nozzles having different cross sectional openings for providing a stepped area ratio between the high pressure and low pressure air. By opening and closing the nozzles, the proper temperature and pressure of the air in the air conditioning system is provided.

The apparatus for mixing high and low pressure air from a jet engine and introducing the mixed air into an air duct of an air conditioning system of an aircraft includes a low pressre air supply line adapted for connection at one end to the low pressure bleed air of the jet engine. A high pressure air supply line is adapted for connection at one end to the high pressure bleed area of the jet engine. An air-mixing chamber having an inlet section is connected to the other end of the low pressure air supply line. The chamber also includes the inlet section flared inwardly into a venturi section. The venturi section is connected to an outwardly flared diffuser outlet section. The outlet section is adapted for connection to the air duct. A high pressure air supply bypass line is connected to the high pressure air supply line and the air duct. A bypass valve is connected to the high pressure bypass air supply bypass line. A plurality of high pressure nozzles are connected to nozzle valves. The valves are connected to the high pressure air supply line. The ends of the nozzles are positioned in the inlet section of the air-mixing chamber. A temperature control is connected to the nozzle valves for opening and closing the nozzle valves. The control is also connected to the bypass valve for opening and closing the bypass valve. A temperature sensor is adapted for connection to the air duct and is connected to the temperature control for regulating the temperature control.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
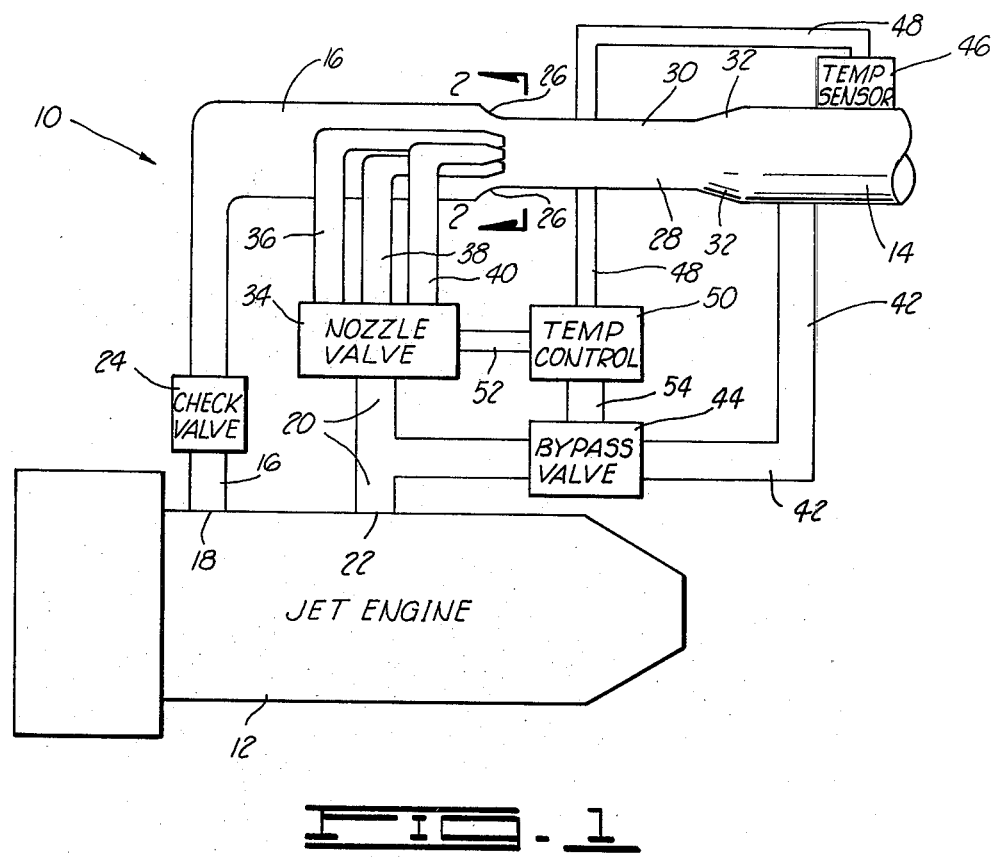
FIG. 1 illustrates a schematic of the apparatus for mixing high and low pressure air from a jet engine and introducing the mixed air to the air conditioning system of the aircraft.

In FIG. 1, a schematic of an apparatus for mixing high and low pressure air is illustrated and designated by general reference numeral 10. The apparatus 10 is adapted for connecting to a jet engine 12 of an aircraft. The apparatus 10 is also adapted for connecting to an air duct 14 which is part of the aircraft's air conditioning system.

The apparatus 10 includes a low pressure air supply line 16 which is connected to a low pressure bleed air port 18 of the jet engine 12. Also, a high pressure air supply line 20 is connected to a high pressure bleed air port 22 of the jet engine 12. The low pressure air supply line 16 includes a check valve 24 to prevent high pressure air received in the high pressure air supply line 20 from backing up through the apparatus 10 and into the low pressure line 16. The low pressure air supply line 16 is connected to an inwardly flared inlet section 26 of an air-mixing chamber 28. The chamber 28 also includes a venturi section 30 and an outwardly flared outlet section 32. The outlet section 32 is connected to the air duct 14.

The high pressure air supply line 20 is connected to a first nozzle valve, a second nozzle valve and a third nozzle valve which are indicated by box 34. The valves 34 are each connected respectively to a first nozzle 36, a second nozzle 38, and a third nozzle 40. The ends of the nozzles 36, 38 and 40 are clustered together and centered inside the inlet section 26 of the mixing chamber 28. A high pressure air supply bypass line 42 is also connected to the high pressure air supply line 20 and is connected to the air duct 14. A bypass valve 44 is connected to the bypass line 42.

A temperature sensor 46 is connected to and mounted on the air duct 14. The temperature sensor 46 is connected by line 48 to a temperature control 50. The temperature control is connected by lines 52 and 54 to the nozzle valves 34 and bypass valve 44 for opening and closing the valves 34 and 44.

Figure 2:
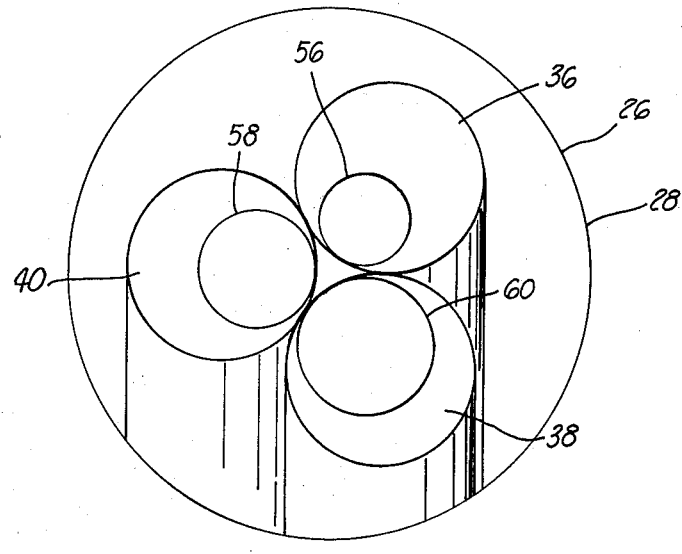
FIG. 2 is a cross section of the mixing chamber taken along lines 2—2 shown in FIG. 1.

In FIG. 2 a cross section of the inlet section 26 of the mixing chamber 28 is taken along lines 2—2 shown in FIG. 1. In this view, the ends of the nozzles 36, 38 and 40 can be seen having different cross sectional areas. The first nozzle 36 has an opening 56 which is smaller than an opening 58 of the nozzle 40. Likewise the opening 58 is smaller than an opening 60 of the nozzle 38. By having various sized openings, different stepped ratios of high pressure air mixed with low pressure air are provided for proper temperature control. The nozzles 36, 38 and 40 can be opened and closed in sequence or in various combinations to obtain the desired air mixture.

The temperature sensor 46 which senses the temperature in the air duct 14 alerts the temperature control 50 of an increase or decrease in temperature of the mixture of the high and low pressure air. The temperature control 50 then opens and closes the nozzle valves 34 which regulate the high pressure air to the nozzles 36, 38 and 40. The bypass line 42 which is connected around the nozzle valves 34 and nozzles 36, 38 and 40, is used for providing high pressure air directly to the air duct 14 when precooling of the high pressure air is not necessary, or when the high pressure air is required for starting another jet engine. The temperature control 50 which is operated by the temperature sensor 46, is used to turn the bypass valve 44 on and off.

In FIGS. 1 and 2, while three nozzles 36, 38 and 40 for mixing the high pressure and low pressure air are shown, it can be appreciated that more than three nozzles could be used equally well for a more accurate mixture of the high and low pressre air temperature control and flow rate. Also, it should be mentioned that the ends of the nozzles 36, 38 and 40 are clustered together in the center of the inlet section 26 to provide a more thorough mix of the air and for drawing the low pressure air from the supply line 16 into the venturi section 30 of the mixing chamber 28.

Operation of the apparatus 10 is controlled by the temperature of the air in the air duct 14 with a minimum and a maximum temperature limit set for the system. For engine idle or low power runway taxi operation, the bleed air temperature would decline below the minimum temperature limit and the temperature sensor 46 would actuate and open the bypass valve 44 and close the nozzle valves 34. Air flow would then be bypassed around the nozzle valves 34. For engine take-off power operation, the maximum temperature limit would be exceeded using high pressure air. Therefore, the temperature control 50 actuated by the temperature sensor 46 would close the bypass valve 44 and open all of the valves 34 thereby supplying high pressure air through all of the nozzles 36, 38 and 40. If the temperature sensor 46 still sensed a temperature over the maximum limit, the temperature control 50 would close two of the nozzles in sequence, leaving only one of the nozzles flowing high pressure air into the low pressure air stream. The air flow temperature in the duct 14 would then be between the maximum and the minimum temperature limits.

As the airplane climbs to a normal cruise altitude, the mixed air flow of high and low pressure air reaches the minimum temperature limit and an additional nozzle would be opened to allow more high pressure air to be mixed with the low pressure air. As the airplane climbs above normal cruise altitudes, the mixed air temperature again reaches the minimum temperature limit due to the colder ambient temperatures and at this time the third nozzle would be opened.

For descent from a high altitude, the jet engine would be throttled to idle descent power and the minimum temperature limit would be reached again. The temperature control 50 would then close the nozzles 34 and open the bypass valve 40 to flow high pressure air directly to the air duct 14. This sequence of opening and closing the bypass valve 44 and nozzle valves 34 operated by the temperature control 50, allows the required flow rates and pressure to be obtained within the predetermined temperature limits.

Changes may be made in the construction and arrangement of the parts or elements of the embodiment as disclosed herein without departing from the spirit or scope of the invention as defined in the following claims.

We claim:

1. An apparatus for mixing high and low pressure air from a jet engine and introducing the mixed air to an air duct of the air conditioning system of an aircraft, the apparatus comprising:

a low pressure air supply line adapted for connection at one end to the low pressure bleed air of the jet engine;

a high pressure air supply line adapted for connection at one end to the high pressure bleed air of the jet engine;

an air-mixing chamber having an inlet section connected to the other end of the low pressure supply line and an outlet section adapted for connection to the air duct;

a high pressure air supply bypass line connected to the high pressure air supply line and adapted for connection to the air duct;

a bypass valve connected to the high pressure air supply bypass line;

a plurality of high pressure nozzles connected to nozzle valves, the nozzle valves connected to the other end of the high pressure air supply line, the ends of the high pressure nozzles received in the air-mixing chamber for mixing high pressure air with the low pressure air;

a temperature control connected to the nozzle valves for opening and closing the nozzle valves, the control also connected to the bypass valve for opening and closing the bypass valve; and a temperature sensor adapted for connection to the air duct for sensing the temperature of the mixed air, the sensor also connected to the temperature control for regulating the temperature control.

2. The apparatus as described in claim 1, wherein the ends of the nozzles are centered in the inlet section of the air-mixing chamber.

3. The apparatus as described in claim 1 wherein the air-mixing chamber further includes a venturi section connected between the inlet section and the outlet section of the chamber, the inlet section flared inwardly into the venturi section, the outlet section flared outwardly from the venturi section.

4. The apparatus as described in claim 1, wherein the openings of each of the ends of the nozzles have a different cross sectional area for providing a stepped area ratio of the high pressure air mixed with the low pressure air when the nozzles are opened and closed.

5. The apparatus for mixing high and low pressure air from a jet engine and introducing the mixed air to an air duct of the air conditioning system of an aircraft, the apparatus comprising:

a low pressure air supply line adapted for connection at one end to the low pressure bleed air of the jet engine;

a high pressure air supply line adapted for connection at one end to the high pressure bleed air of the jet engine;

an air-mixing chamber having an inlet section connected to the other end of the low pressure air supply line, the inlet section flared inwardly into a venturi section, the venturi section connected to an outwardly flared outlet section, the outlet section adapted for connection to the air duct;

a high pressure air supply bypass line connected to the high pressure air supply line and adapted for connection to the air duct;

a bypass valve connected to the high pressure air supply bypass line;

a first, a second, and a third high pressure nozzle, the nozzles connected to a first nozzle valve, a second nozzle valve, and a third nozzle valve, respectively, the nozzle valves connected to the high pressure air supply line, the ends of the nozzles positioned in the air-mixing chamber for mixing the high pressure air with the low pressure air;

a temperature control connected to the nozzle valves for opening and closing the nozzle valves, the control also connected to the bypass valve for opening and closing the bypass valve; and a temperature sensor adapted for connection to the air duct for sensing the temperature of the mixed air, the sensor also connected to the temperature control for regulating the temperature control.

6. The apparatus as described in claim 5, wherein the ends of the first, second and third nozzles are centered in the inlet section of the air-mixing chamber.

7. The apparatus as described in claim 5, wherein the openings in each end of the first, second and third nozzles have a different cross sectional area for providing a stepped area ratio of high pressure air mixed with low pressure air when the nozzles are opened and closed.

* * * * *